(12) United States Patent
Shagam et al.

(10) Patent No.: US 7,810,026 B1
(45) Date of Patent: Oct. 5, 2010

(54) OPTIMIZING TYPOGRAPHICAL CONTENT FOR TRANSMISSION AND DISPLAY

(75) Inventors: Joshua Shagam, Seattle, WA (US); Robert L Goodwin, Mercer Island, WA (US)

(73) Assignee: Amazon Technologies, Inc., Reno, NV (US)

(*) Notice: Subject to any disclaimer, the term of this patent is extended or adjusted under 35 U.S.C. 154(b) by 904 days.

(21) Appl. No.: 11/540,114

(22) Filed: Sep. 29, 2006

(51) Int. Cl.
G06F 17/27 (2006.01)

(52) U.S. Cl. .................. 715/242; 715/252; 715/254; 715/256; 715/234; 382/175; 382/176; 382/177; 382/178

(58) Field of Classification Search .................. 382/175, 382/176, 177, 178; 715/242, 254, 256, 252, 715/234
See application file for complete search history.

(56) References Cited

U.S. PATENT DOCUMENTS

| | | | |
|---|---|---|---|
| 4,741,045 A | 4/1988 | Denning | |
| 5,029,107 A | 7/1991 | Lee | |
| 5,285,526 A | 2/1994 | Bennett et al. | |
| 5,671,438 A | 9/1997 | Capps et al. | |
| 5,774,580 A | 6/1998 | Saitoh | |
| 5,784,487 A | 7/1998 | Cooperman | |
| 5,850,490 A | 12/1998 | Johnson | |
| 5,860,074 A * | 1/1999 | Rowe et al. | 715/235 |
| 5,907,631 A | 5/1999 | Saitoh | |
| 5,978,819 A | 11/1999 | Berstis | |
| 6,002,798 A | 12/1999 | Palmer et al. | |
| 6,032,163 A | 2/2000 | Tou et al. | |
| 6,256,610 B1 | 7/2001 | Baum | |
| 6,377,704 B1 | 4/2002 | Cooperman | |
| 6,766,495 B1 | 7/2004 | Bates et al. | |
| 7,213,035 B2 | 5/2007 | Ornstein et al. | |
| 7,219,309 B2 | 5/2007 | Kaasila et al. | |
| 7,272,258 B2 | 9/2007 | Berkner et al. | |
| 7,362,311 B2 | 4/2008 | Filner et al. | |
| 7,392,472 B2 | 6/2008 | Simard et al. | |
| 7,412,647 B2 | 8/2008 | Sellers et al. | |

(Continued)

OTHER PUBLICATIONS

PDF Reference Fifth edition, Adobe Portable Document Format Version 1.6, 1985-2004 Dobe System Incorporated, Chapter 5.9, pp. 440-446.*

(Continued)

*Primary Examiner*—Joshua D Campbell
*Assistant Examiner*—Christopher Bryant
(74) *Attorney, Agent, or Firm*—Knobbe, Martens Olson & Bear LLP

(57) ABSTRACT

A method for optimizing a source document comprising a plurality of pages of content, comprising each of the following, is presented. A source document is obtained. An optimized document is created corresponding to the source document. Thereafter, for each page in the source document, the following are applied. A page record is created for the page. Each page record comprises a word table comprising a list of the page's words in the order that they appear in the page's content. Each page record further comprises a paragraph entry list for the page including a paragraph entry for each paragraph in the page. Each paragraph entry includes a reference to the first and last word of that paragraph in the word table. The page record is compressed using a compression technique. Thereafter, the compressed page record is stored in the optimized document.

33 Claims, 11 Drawing Sheets

U.S. PATENT DOCUMENTS

| | | | |
|---|---|---|---|
| 7,433,548 | B2 | 10/2008 | Goodwin et al. |
| 7,469,388 | B1 | 12/2008 | Baudisch et al. |
| 7,486,628 | B1 | 2/2009 | Brisebois et al. |
| 2002/0052898 | A1* | 5/2002 | Schilit et al. ................ 707/530 |
| 2003/0014445 | A1 | 1/2003 | Formanek et al. |
| 2003/0126558 | A1 | 7/2003 | Griffin |
| 2003/0128234 | A1 | 7/2003 | Brown et al. |
| 2003/0135649 | A1* | 7/2003 | Buckley et al. ............. 709/247 |
| 2004/0103371 | A1 | 5/2004 | Chen et al. |
| 2004/0139384 | A1* | 7/2004 | Lin ............................. 715/500 |
| 2004/0146199 | A1* | 7/2004 | Berkner et al. ............. 382/176 |
| 2005/0125549 | A1 | 6/2005 | Katayama |
| 2005/0128516 | A1 | 6/2005 | Tomita |
| 2005/0234893 | A1 | 10/2005 | Hirsch |
| 2006/0005116 | A1 | 1/2006 | Ferguson et al. |
| 2006/0282838 | A1 | 12/2006 | Gupta et al. |
| 2007/0061704 | A1 | 3/2007 | Simova et al. |
| 2007/0112810 | A1* | 5/2007 | Jonsson ...................... 707/101 |
| 2008/0267535 | A1 | 10/2008 | Goodwin et al. |

OTHER PUBLICATIONS

Taghva et al., The Impact of Running Headers and Footers on Proximity Searching, Information Science Research Institute, University of Nevada, 2004, Las Vegas, Nevada, 5 pages.

Lin, X., Header and Footer Extraction by Page-Association, Hewlett-Packard Company, May 6, 2002, Palo Alto, California, U.S., pp. 1-8.

Montanès, E., et al. , Towards Automatic and Optimal Filtering Levels for Feature Selection in Text Categorization, Advances in Intelligent Data Analysis VI, Sep. 2005, pp. 239-248.

* cited by examiner

OPTIMIZING TYPOGRAPHICAL CONTENT FOR TRANSMISSION AND DISPLAY

FIELD OF THE INVENTION

The present invention is directed to a system for optimizing source documents for transmission and displaying on a display device.

BACKGROUND

As more and more users turn to computer networks such as the Internet and World Wide Web (hereinafter the "Web") for information, content providers are increasingly converting traditional content (e.g., printed materials such as books, magazines, newspapers, newsletters, manuals, guides, references, articles, reports, documents, and the like) to electronic form.

For some content providers, a quick and simple way to convert printed content to an electronic form for publication is to create a digital image of the printed content, i.e., a digital image containing representation of text. As those skilled in the art will appreciate, this type of conversion is typically performed through the use of a scanner. However, while simply generating a digital image (or images) of printed content can be accomplished quickly, the resulting digital images might not be particularly well suited for various scenarios. For example, digital images corresponding to the conversion of pages of a book into electronic form may not be well suited in some viewing scenarios. Of course, the reasons that a digital image is not always an optimal form/format of delivery are many, but include issues regarding the clarity or resolution of digital images, the large size of a digital image file and, perhaps most importantly, the rendering of the digital images on various sized displays. For example, traditional digital images may be of a fixed size and arrangement such that a computer user must frequently scroll his or her viewer to read the text. In other words, the text of a digital image can not be "reflowed" within the boundaries of the viewer. Generally described, "reflow" relates to the adjustment of line segmentation and arrangement for a set of segments. Digital content, such as digital text, that can be rearranged according to the constraints of a particular viewer, without the necessity of scaling, can "reflow" within the viewer, and is reflow content.

A novel approach to converting printed content into reflow digital content relates to processing content in a digital image into identifiable segments. An example of such an approach is set forth in co-pending and commonly assigned patent application entitled "Method and System for Converting a Digital Image Containing Text to a Token-Based File for High-Resolution Rendering," filed Mar. 28, 2006, U.S. patent application Ser. No. 11/392,213, which is incorporated herein by reference. As described in this reference, the content in a digital image is categorized into "glyphs," e.g., identifiable segments of content that can be scaled and/or reflowed within the boundaries of a viewer.

One of the issues with creating documents of reflowable content is the resultant size of the document. However, for display purposes, it is preferable to store the reflowable content in a structured document, such as an XML document, that facilitates easy identification of structure, such as pages, paragraphs, words, etc. However, most standard document formats, including XML, are largely text based and thus include a lot of excess space/data to support the document format, but which is not necessary to the actual content itself. For example, FIG. 1A is a pictorial diagram illustrating portions of an exemplary XML source document 100 of reflowable content. Of course, the XML document 100 includes data tables, such as global glyph table 102, but those skilled in the art will recognize that the values stored therein are stored as textual representations of the actual values, which leads to "bloated" data areas.

FIG. 1A does illustrate the structural nature of printed material converted to reflowable content. For example, assuming that source document 100 represents a printed book converted to reflowable content, the document is structurally organized into pages, as indicated by pages 104 and 106. Each page is similarly segmented into one or more paragraphs, as indicated by paragraphs 108 and 110. Further structure in a reflowable document includes a list of words, such as words 112 and 114, within each paragraph. Moreover, consistent with the nature of the reflowable content, i.e., the words of the exemplary source document 100 are represented as glyphs, each word is comprised of a series of glyphs, such as glyphs 116-120.

It should be understood, however, that since the page content is represented by glyphs, the definition of a "word" of reflowable content may or may not correspond to what would be considered a word in a normal textual context. More particularly, when the term "word" is used this document with reference to glyph-represented reflowable content, the term "word" should be understood to refer to a collection or grouping of symbols and/or characters such that they are treated as a single unit. For example, with regard to FIG. 1B, which is a pictorial diagram of reflowable content, in the content are several textual words that may be grouped in a glyphing process as a single "word." For example, the textual words "Stryker Sales", as identified by box 152, may be grouped in a glyphing process as a single reflowable word, rather than as the two textual words that a human reader would likely view. Similarly, without understanding the context, a glyphing process would determine the text, "bar-triggering," identified by box 154, as a single, reflowable word even though a human reader would likely not. Moreover, with regard to italicized textual words, which are converted to reflowable words, the italicized reflowable version of the text will very likely be viewed as a different word than the oblique (normal) reflowable version. In other words, a reflowable word "Stryker Sales" will be separate from the oblique reflowable word "Stryker Sales."

With regard to the term "page," while a page of content may correspond to the textual content imaged onto a paper sheet, the present invention is not so limited. Instead, a "page" of content corresponds to a section or segment of content intended for display as a whole.

Yet another issue with regard to using standard document formats relates to security and/or control over the reflowable content. For example, as those skilled in the art will appreciate, a document of reflowable content written to an XML document may be viewed by any number of viewers, thereby resulting in the loss of control by those who converted the document.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method for optimizing a source document comprising a plurality of pages of content, comprising each of the following, is presented. A source document is obtained. An optimized document is created corresponding to the source document. Thereafter, for each page in the source document, the following are applied. A page record is created for the page. Each page record comprises the content for that page. Moreover, for each set of values in the page record, that set of values is selectively filtered in order to minimize the storage requirement for the set of values. The page record is compressed using a lossless compression technique. Thereafter, the compressed page record is stored in the optimized document.

A computing device for optimizing a source document is also presented. The computing device comprises a processor, a memory, and at least one executable module. Upon execution of the executable module, the computing device is configured to perform each of the following. Create an optimized document corresponding to the source document. Thereafter, for each page in the source document, the following are performed. A page record is created for the page. Each page record comprises the content for the page. Moreover, for each set of values in the page record, the set of values is filtered to minimize the storage requirement for the set. The page record is compressed using a lossless compression technique. Thereafter, the compressed page record is stored in the optimized document.

A method for displaying a page of content contained in an optimized document is presented. When executed on a computing device including a processor and a memory, the method carries out each of the following. An optimized document is obtained, the optimized document containing at least one page of content. A compressed page record in the optimized document that corresponds to a page to be displayed is located. The compressed page record is decompressed using a decompression counterpart to a lossless compression technique used to compress the page record. An unfiltering is performed on each set of values in the page record according to the filter determined to be applied to the particular set of values. Thereafter, the exemplary routine causes the decompressed content to be displayed.

A device for outputting a page of content from an optimized document is also presented. The device includes a processor, a memory, and an executable module. Upon execution of the executable module, the device is configured to perform the following. An optimized document containing at least one page of content is obtained. A compressed page record in the optimized document corresponding to a page of content to be output is located. The compressed page record is decompressed using a decompression counterpart to a lossless compression technique used to compress the page record. An unfiltering is performed on each set of values in the page record according to the filter determined to be applied to the particular set of values. The device causes the content in the decompressed page record to be output.

A computer-readable medium bearing computer-executable instructions is presented. When the computer-executable instructions are executed on a computing device having a processor and memory, they carry out a method for displaying a page of content stored in an optimized document comprising the following steps. An optimized document containing at least one page of content is obtained. A compressed page record in the optimized document that corresponds to a page to be displayed is located. The compressed page record is decompressed using a decompression counterpart to a lossless compression technique used to compress the page record. The decompressed page record is restored using a restoration counterpart to a variable length encoding technique used on the page record. A determination is made as to which of a plurality of filters was applied to a plurality of sets of values in the page record, and the sets of values are unfiltered according to the corresponding determined filter applied. A corresponding unfiltering counterpart to unfilter the restored page record is selected and used to unfilter the restored page record. Thereafter, the content in the page record to be displayed on a display device is caused to be displayed.

A networked document source for providing optimized documents of page content in response to a request for an optimized document is presented. The networked document source comprises a processor, a memory, and an executable module. When executed, and in response to a request for an optimized document over the network, the executable module configures the document source to provide the corresponding optimized document. The optimized document comprises the following components: a plurality of compressed page records and a global glyph table. Each compressed page record comprises the content for the page and a plurality of sets of values, that have been filtered independently of other sets of values, to minimize their storage requirements. The global glyph table describes all glyphs within the optimized document.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
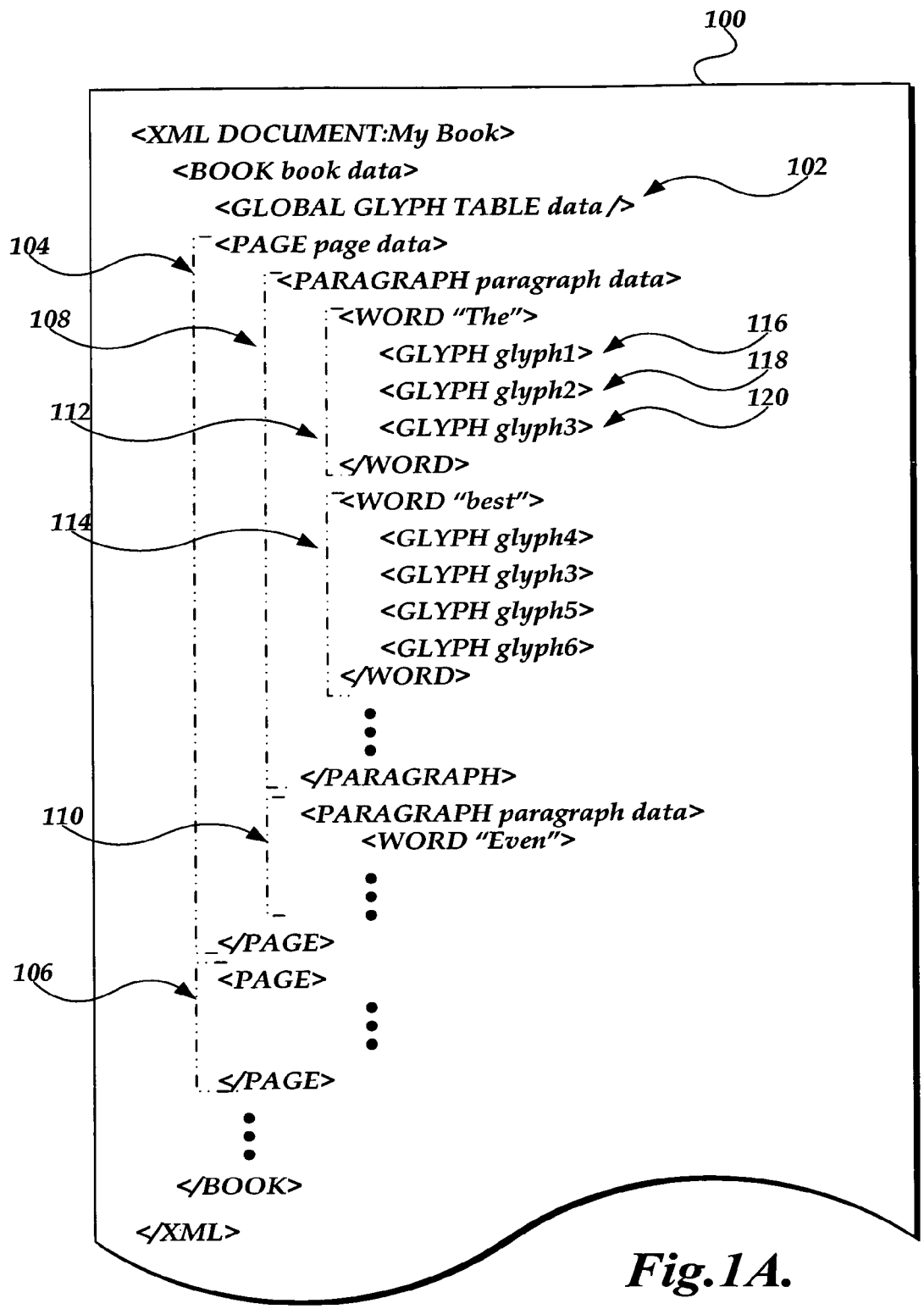
FIGS. 1A and 1B are pictorial diagrams illustrating exemplary content suitable for conversion to an optimized source document.
Figure 1B:
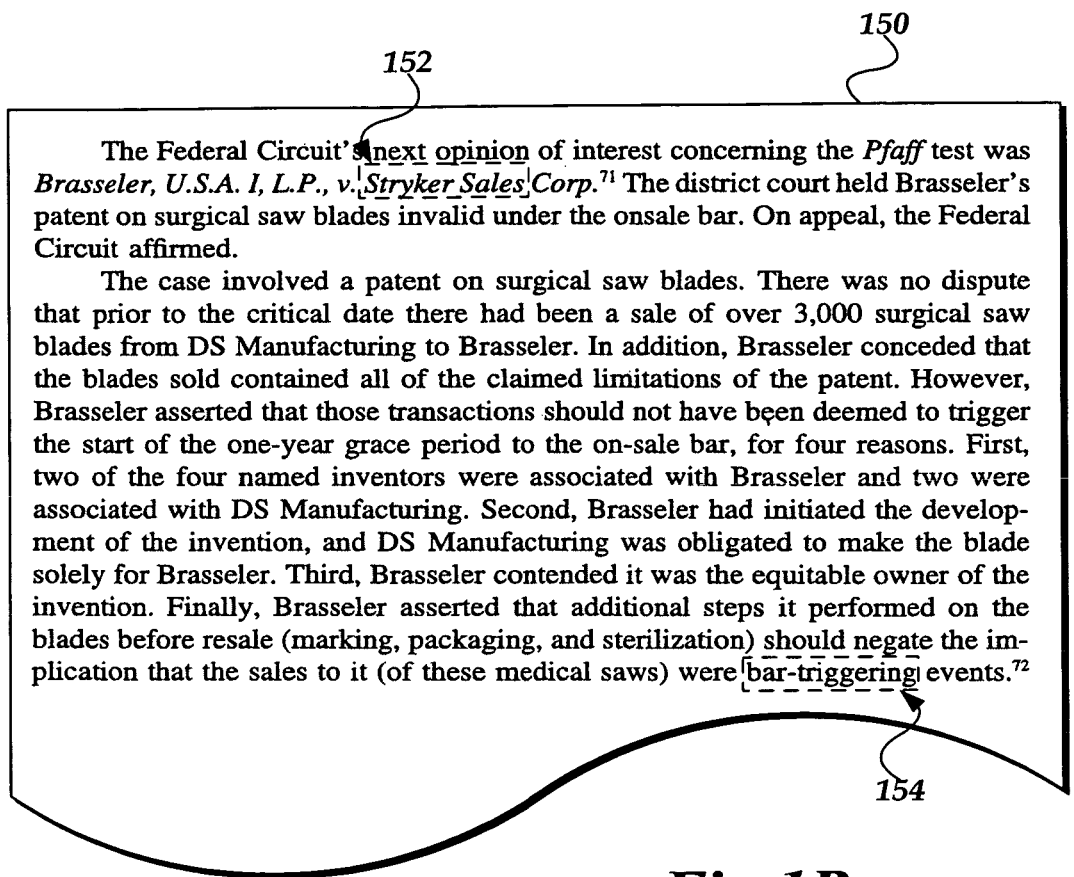

While it is not necessary that the source document (i.e., the un-optimized document containing reflowable content) be written to any particular format, the following discussion will assume that the source document is an XML based document, such as illustrated in FIG. 1. Moreover, it should be appreciated that any or all aspects of the present invention may be beneficially applied to any document, whether or not that document is reflowable or not.

Figure 2:
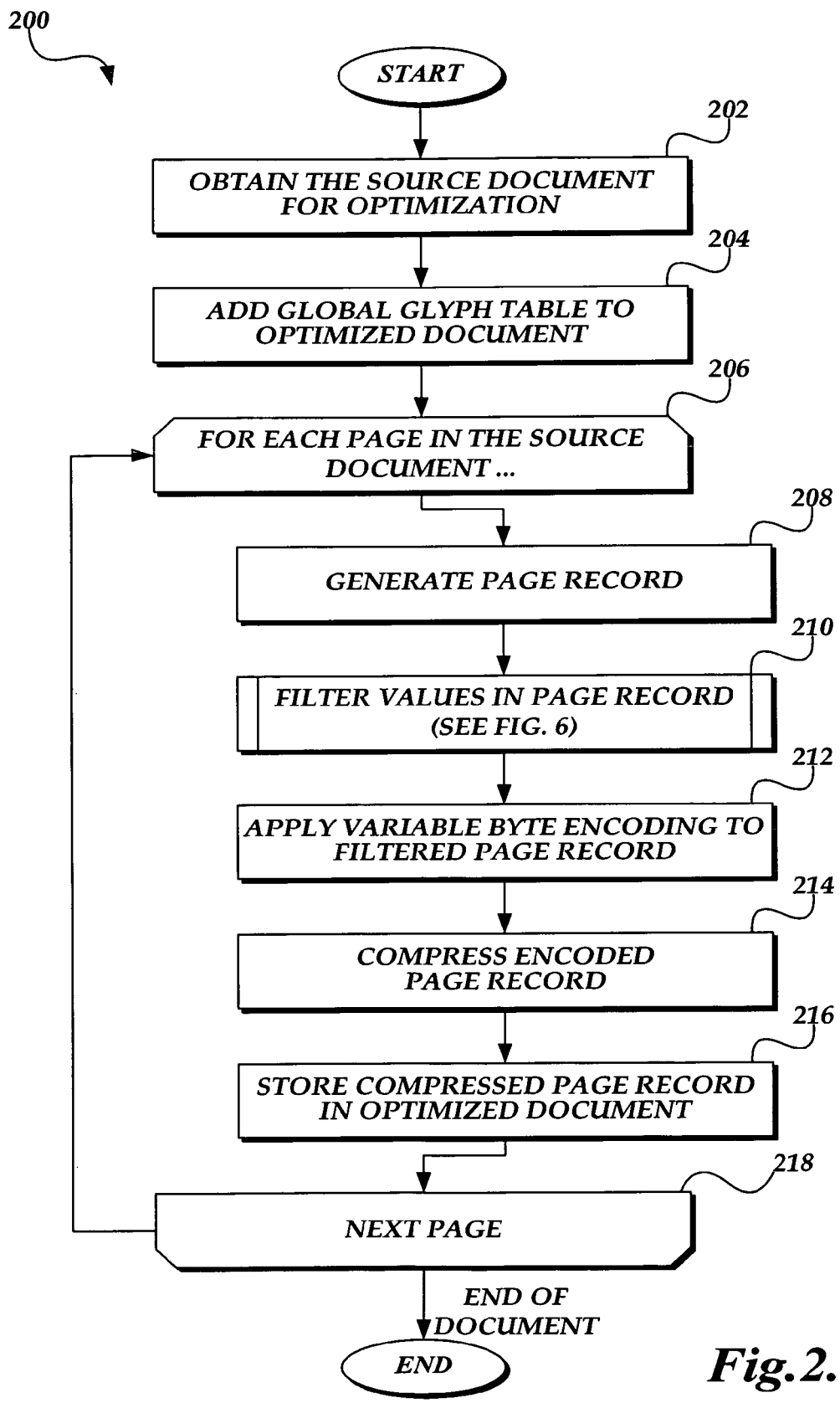
FIG. 2 is a flow diagram illustrating an exemplary routine for optimizing a source document.

With regard to optimizing a source document 100 into an optimized document, FIG. 2 is a flow diagram illustrating an exemplary routine 200 for optimizing the source document. Beginning at block 202, a source document 100 intended for optimization is obtained. As indicated above, the source document may be written to any format, whether or not that format is a standard or proprietary format. Still further, as an alternative to obtaining a written source document (not shown), the source document may be provided as a stream and/or collection of data on the computer or device executing the optimization routine 200, or as a stream of data from an external source. However, while there are several alternative embodiments, as mentioned above, the following discussion will be made with regard to obtaining information from an XML formatted source document 100.

At block 204, a global glyph table 102 is obtained from the source document 100. As described in greater detail in regard to the above-incorporated reference "Method and System for Converting a Digital Image Containing Text to a Token-Based File for High-Resolution Rendering," glyphs are not alphanumeric characters, per se, but are drawing representations (strokes, curves, lines, etc., all of which are described as contours and vertices) of the textual content. Thus, the global glyph table 102 is literally a structure that contains all of the glyphs found within the source document 100. The structure of an exemplary global glyph table 102 is described below in regard to FIG. 3. It should be appreciated, however, that while block 204 suggests obtaining an existing global glyph table 102 from the source document 100, in an alternative embodiment, obtaining the global glyph table comprises generating the global glyph table based on information in the source document (or from the source data stream or memory structures).

Figure 3:
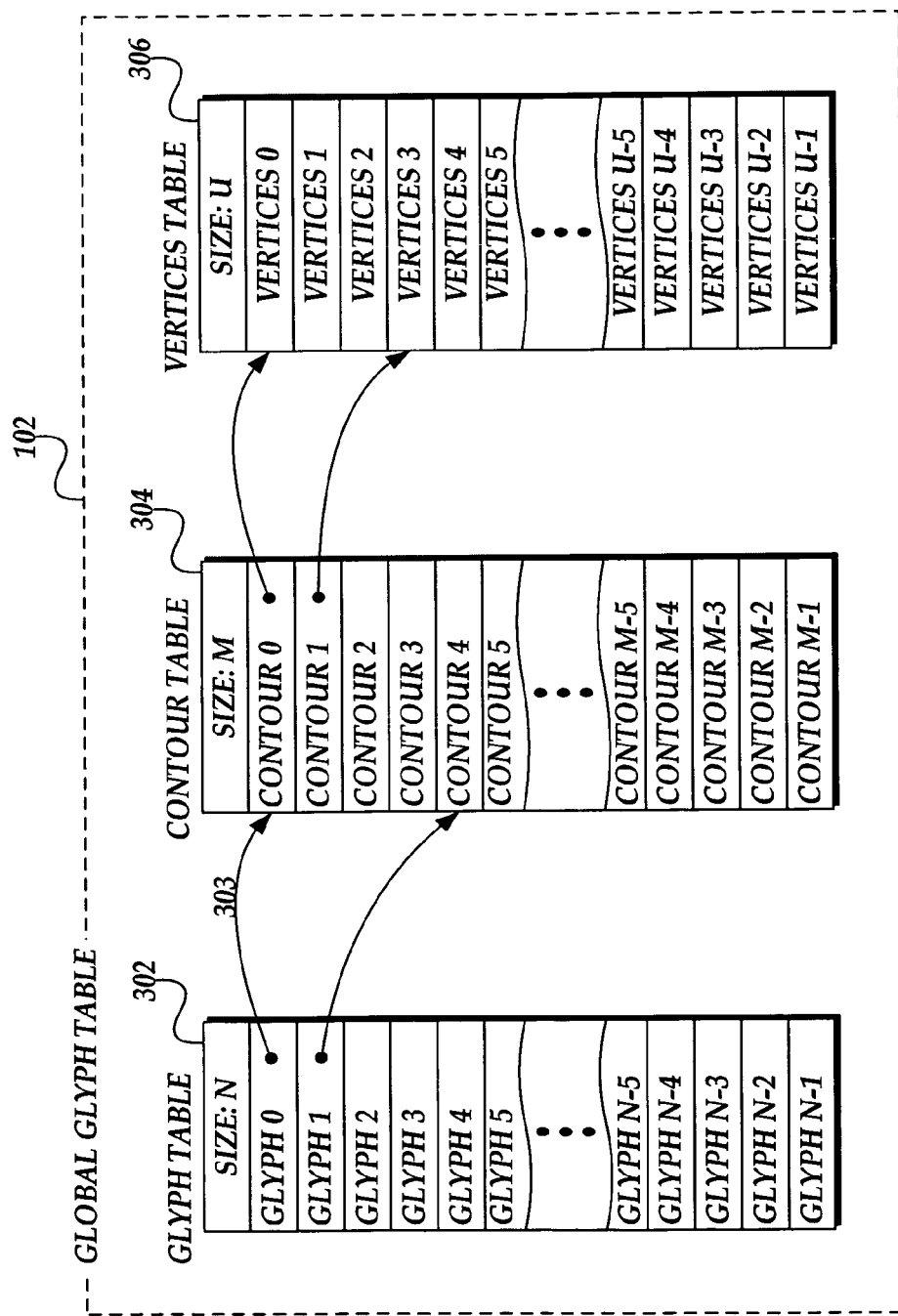
FIG. 3 is a block diagram illustrating an exemplary embodiment of a global glyph table suitable for use in an optimized source document.

With regard to the structure of a global glyph table, FIG. 3 is a block diagram illustrating an exemplary embodiment of global glyph table 102 suitable for use in an optimized source document. In the illustrated embodiment, the exemplary global glyph table 102 includes three separate tables: a glyph table 302, a contour table 304, and a vertices table 306. The glyph table 302 may be viewed as an indexed table which points (or indexes) to the contours of which each glyph is comprised. Thus, glyphs can be identified by a value, and that value used as an index to the contours of the glyph.

Each entry in the glyph table 302 references an entry into the contour table 304, as indicated by arrow 303. The reference may be an index into the contour table 304 or a pointer to the first contour for a glyph. However, the index for a given glyph does not necessarily correspond to the index of the one or more contours of the glyph in the contour table 304. This is because there are frequently more than one contour for each glyph. For example, as shown in FIG. 3, Glyph 0 includes Contours 0-3.

In one embodiment, contours are Bezier splines based on one or more sets of vertices. Thus, in addition to other information related to the contour, each contour points (or indexes) to one or more (typically at least two) sets of vertices. Thus, for example as illustrated in FIG. 3, Contour 0 includes Vertices 0-3.

Each of the tables in the global glyph table 102 are illustrated as including a size value, indicating the number of entries in the table. However, while in one exemplary embodiment, each table does include a size value, this is a matter of implementation preference, and not a limiting factor with regard to the present invention. Additionally, each of the individual tables in the global glyph table 102 are shown as arrays of information where index values may be used to locate a particular element. However, this too is simply an implementation detail. As those skilled in the art will appreciate, any number of data structures may be used, such as arrays, linked lists, and the like. Correspondingly, the references to the various elements would be suitably implemented as indices, pointers, etc.

It should also be appreciated that while the illustrated global glyph table 102 is comprised of three separate tables, this too is an implementation detail and should not be construed as limiting upon the present invention. In an alternative embodiment, the information found in each of the tables may be combined into a single organization or structure. However, by separating the global glyph table 102 into the separate tables as shown in FIG. 3, various efficiencies with regard to indexing, referencing, and storage may be realized.

Figure 4:
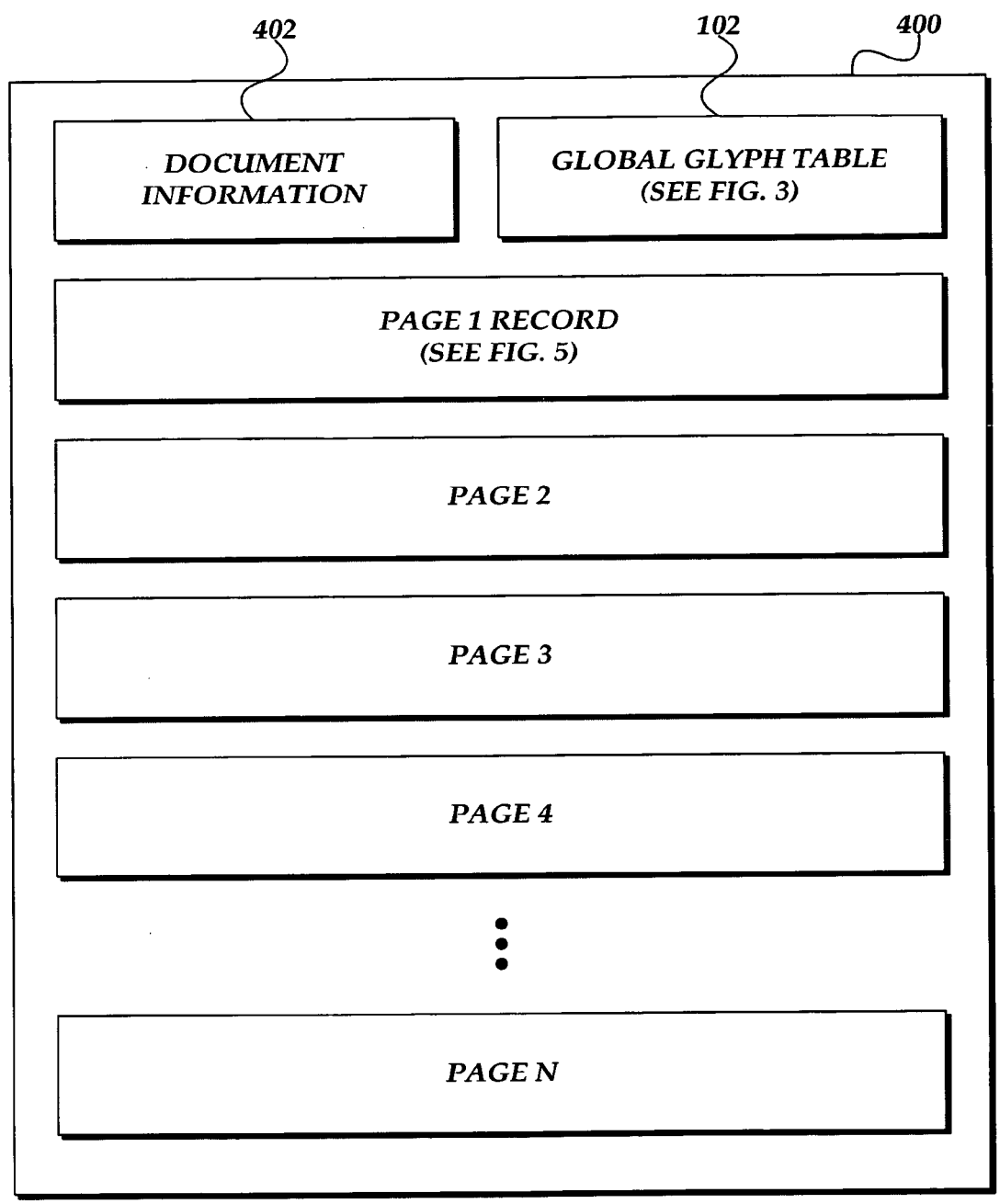
FIG. 4 is a block diagram illustrating exemplary components of an optimized source document.

Returning again to FIG. 2 and with further reference to FIG. 4, which is a block diagram illustrating components of an optimized document 400, after obtaining the global glyph table 102, at block 204 the global glyph table is written to the optimized document 400. Moreover, while not shown as a step in FIG. 2, other document related information 402 that may be important or relevant to the document, that is not part of the pages of reflowable content, is also written to the optimized document 400.

After adding the global glyph table 102 (and other document related information 402) to the optimized document 400, at control block 206 a looping construct is begun. This looping construct is designed to iterate through each page in the source document and write a corresponding page record, such as page records 404-412, into the optimized document. Accordingly, at block 208, for a given page of reflowable content, a page record is generated. In one embodiment, the page record includes one or more paragraph records, a word table, and a word/glyph table. The nature of this particular embodiment of a page record, its paragraph entries, word table, and word/glyph table is described below in regard to FIG. 5.

Figure 5:
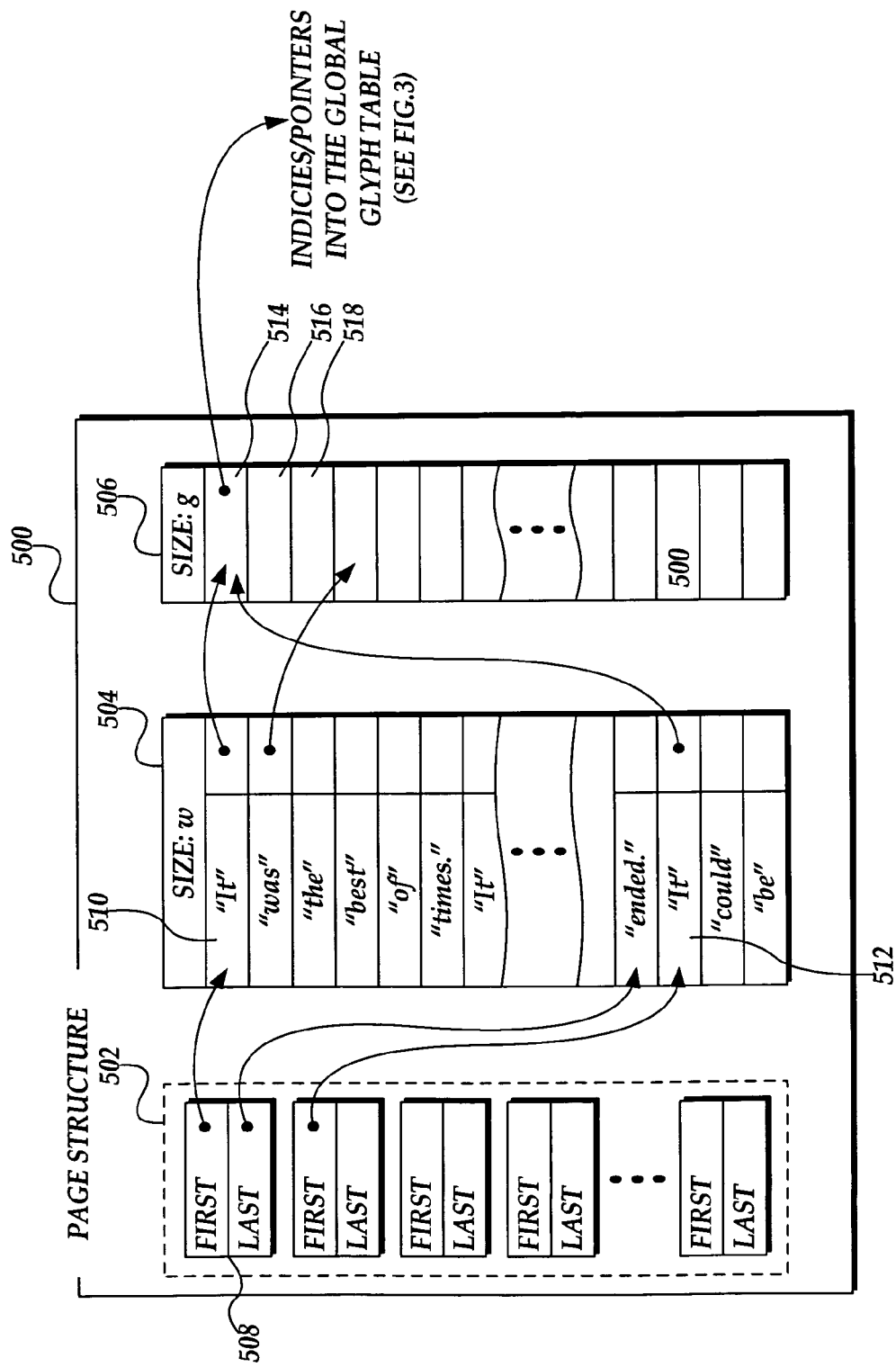
FIG. 5 is a block diagram illustrating an exemplary embodiment of a page record for storage within an optimized source document.

FIG. 5 is a block diagram illustrating an exemplary embodiment of a page record 500 for storage within an optimized source document 400. As already mentioned, the page record includes one or more paragraph entries 502, a word table 504, and a word/glyph table 506. With regard to the paragraph in the context of reflowable content, it should be understood that the elements of each page are independent of other pages. Thus, while contextually the content of a single paragraph may span over two or more pages, according to the present invention each page views its portion of the page as its own paragraph independent of other pages.

Each paragraph in the page has a corresponding entry in the page entries 502. The page entries 502 may or may not be records in a table structure or array. However, each page entry, such as page entry 508 includes a reference to the first word for the paragraph as well as a reference to the last word in the paragraph. While not shown, each paragraph entry may also include other information corresponding to the particular paragraph, such as margins, first line indentation, spacing, line height, and the like.

With regard to the word table 504, an entry is made into the word table for each word on the entire page. Thus, except for indentation and paragraph breaks, one could "read" content of the page by reading the words in the order that they appear in the word table 504. Accordingly, each paragraph entry simply points to or references the first and last words of its paragraph in the list of words for the page. According to one embodiment and as shown in the word table 504, each entry in the word table 504 includes a textual interpretation of the glyphs that comprise the record, as well as a pointer to a series of glyphs that collectively comprise the word. While words in the word table are repeated, the series of glyphs that comprise a given word do not need to be repeated. For example, words 510 and 512 both represent the word "It," and this word is repeated at least twice in the word table 504. However, both words 510 and 512 can efficiently reference the same corresponding series of glyphs in the word/glyph table 506, particularly glyphs 514-518.

With regard to the word/glyph table 506, for each word found in the current page, the series of glyphs that are determined to make up that word are listed in the word/glyph table. As mentioned, each time that word appears in the word table 504, reference is made to the corresponding series of glyphs. In turn each entry in the word/glyph table 506 corresponds to an entry into the global glyph table 102 described above.

As can be seen, due to the nature of page records 500, and with the use of the global glyph table 102, each page is independent of all other pages. Accordingly, with reference again to FIG. 2, after generating a page record 500 for the current page, which in one embodiment includes, but is not limited to, paragraph records 502, a word table 504, and a word/glyph table 506, the routine proceeds to block 210. At block 210, the exemplary routine applies various filters to the values of the page record 500 in order to achieve greater storage efficiency. Filtering the values of a page record 500 is described in greater detail in regard to FIG. 6.

Figure 6:
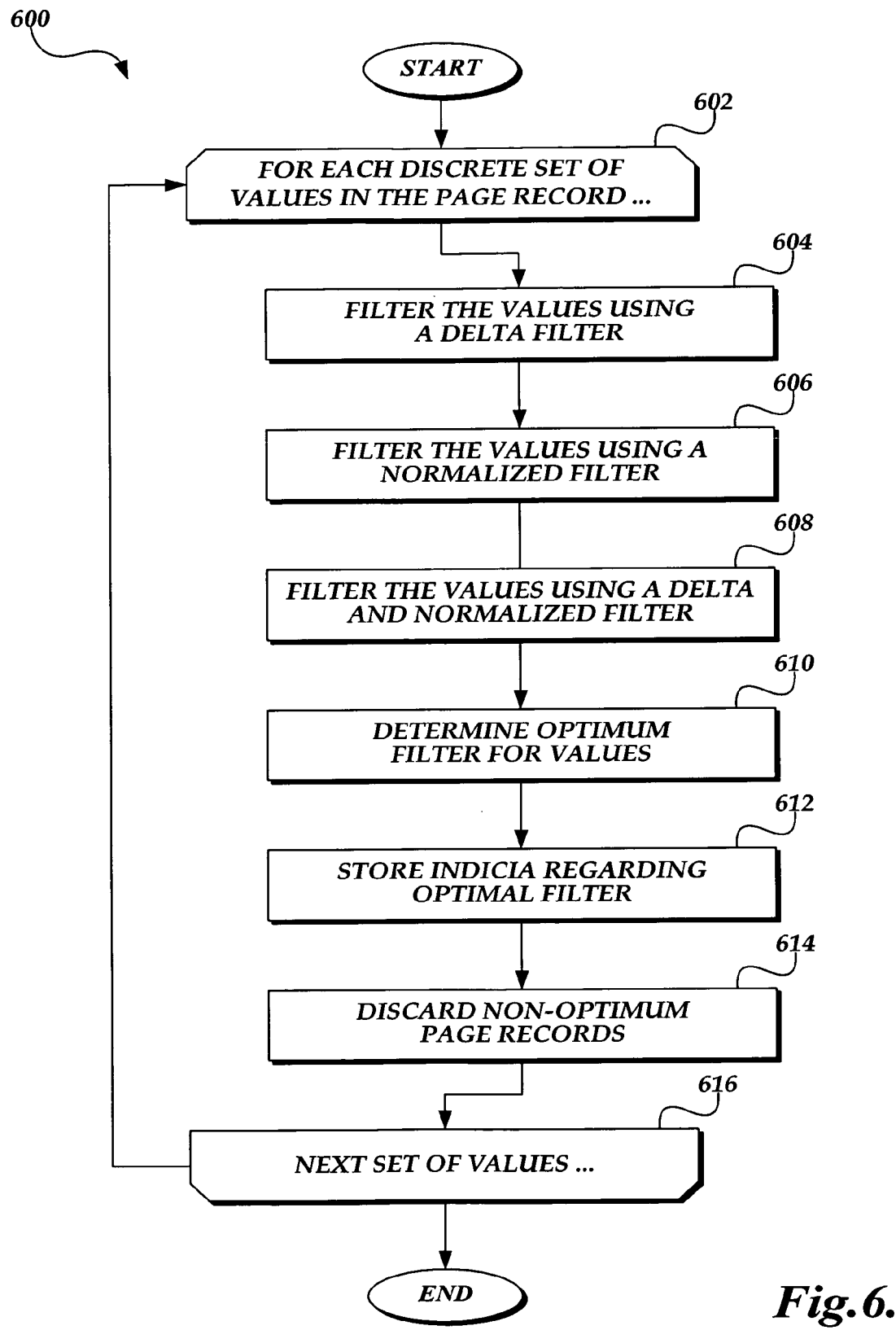
FIG. 6 is a flow diagram illustrating an exemplary filtering subroutine for filtering a page record to achieve greater storage efficiency, and suitable for use in the exemplary optimizing routine described in FIG. 2.

FIG. 6 is a flow diagram illustrating an exemplary filtering subroutine 600 for filtering values in a page record 500 to achieve greater storage efficiency, and suitable for use in the exemplary optimizing routine 200 described in FIG. 2. More particularly, the exemplary subroutine 600 attempts to improve the storage efficiency of the current page record 500 by applying various filters to discrete sets or series of values in the page record and saving the filtered values that results in the optimal storage solution.

One of the advantages realized by individually filtering discrete sets of values within a page record 500 is an improved, optimal storage footprint. More particularly, while all of the values within a page record 500 are used to describe the numerous aspects of a page's reflowable content, filtering the page record as a whole fails to take advantage of the particular nature of the various sets of values in the page record (whether that set is a table of values, a column of values in a table, a row of values in a table, a list of values, and the like). Any given table, table column, or list, or the like, within the page record will often be a "set" of values that may be filtered in a particular fashion to minimize their storage footprint. For example, the horizontal position of reflowable words on a given line of content quite frequently progresses in standard and linear fashion. Similarly, the vertical position for these same reflowable words generally remains constant. Thus, for that set of values that correspond to a horizontal position of reflowable words, a potentially optimal filter (as described below as a delta filter) may be to filter the horizontal positions as a first value with each subsequent value being the difference in position from its previous word. In contrast, since the vertical position varies only slightly up and down from a baseline, the vertical position values may be filtered (as described below as a normalized filter), a potentially optimal filter may be to filter the values as a base or normalized value and all values within the set/series are an offset from that value.

Thus, with regard to filtering the values within the page record, beginning at control block 602, the exemplary routine 600 iterates through the discrete sets of values in the page record 500 to perform the filtering steps described in blocks 604-614.

At block 604, a "delta" filtering is applied to a current set of values in the page record 500. According to aspects of the present invention, a delta filtered page record is generated by storing a first value of a series of values. Thereafter, values in the series are replaced with a delta value from the previous value in the series. For example, assuming that the first four values of the series are "70,500," "70,506," "70,498," and "70,502," the delta encoding for the values would be "70,500," "6," "-8," and "4." Moreover, as a minor alternative to this described delta filtering, the first value is stored outside of the series and the first value in the series is zero, such that the exemplary series would be "0," "6," "-8," and "4."

At block 606, a "normalized" filter is applied to the current set of values. As indicated above, when a "normalized" filter is applied, a base number is stored for all values of the series, and each number/value in the series is normalized to that base value such that the value recorded is an offset to the base value. This type of filtering can minimize the storage of a series of values when their values are large but the difference between them is small. For example, with regard to the above described exemplary values "70,500," "70,506," "70,498," and "70,502," without normalizing them these value would typically require 8 bytes of data of storage for each value. However, if it were understood that their "base" value is "70,498," then the values would be "normalized" to "2," "8," "0," and "4" each of which could be stored in a single byte, thereby realizing a substantial storage savings. Still further, in one embodiment, the lowest value of a series of numbers to be normalized is selected as the base value. For instance, in the previous example, the number "70,498" was chosen rather than the first value "70,500." Selecting the lowest value can be especially useful if any of the offset values may be negative since, as those skilled in the art will appreciate, negative numbers require substantially greater storage area than positive numbers.

At block 608, a delta and normalized filter is applied to the current set of values. In other words, a both the delta filter and the normalized filter are applied to the current set of values.

At having applied all of the various filters to the current set of values, at block 610, a determination is made as to which of the various filters, including no filter at all, represents the most efficient or optimal filter for the given set of values. At block 612, indicia as to which (if any) filter was selected as the optimal filter is stored. At block 614, the non-optimal filtered values are discarded. At end control block 616, if there are additional sets of values within the page record 500 to be filtered, the exemplary routine 600 returns to control block 602 to select another set of values and repeat the filtering described above. Alternatively, if all of the sets of values in the page record 500 have been filtered, the subroutine 600 terminates.

While the above routine 600 has set forth various filters and combinations of filters for reducing the storage footprint of sets of values in a page record, it should be appreciated that other filtering techniques may be applied to reduce the size of the value sets, each of which are anticipated as falling within the scope of the present invention.

Returning again to FIG. 2, after having filtered the various sets of values in the page record 500 for optimal storage efficiency (or not filtering the sets of values, depending on what is optimal), the routine 200 proceeds to block 212. At block 212, the page record is then encoded with a variable length encoding. As those skilled in the art will appreciate, the variable length encoding is used to reduce the number of storage units that an individual value requires in storage. In storage, for each value, if the high bit of a unit is set, this indicates that the value stored in the following unit is also part of the value as a whole. Thus, for each unit of storage with n bits, only n−1 bits are used to represent a portion of the value. Of course, those skilled in the art will appreciate that variable length encoding schemes may be based on, by way of example, bytes, words, double words, or nibbles (4 bits), each of which is anticipated as falling within the scope of the general variable length encoding of the page record 500.

With regard to the variable length encoding, while the exemplary routine 200 illustrates this as a separate step from filtering the values in the page record, this is a logical division only, and should not be construed as limiting upon the present invention, In various embodiments, the variable length encoding may occur as individual sets of values are filtered, or applied to the page record as a whole.

After the page record 500 has been filtered and variable length encoded, at block 214 the page record is compressed using a lossless compression technique. For example, in one embodiment, the filtered and encoded page record 500 is further compressed using the LZ77 (for the Lempel/Ziv 1977 compression format) compression technique. Of course, other alternative lossless compression techniques may be utilized.

At block 216, after the page record 500 is generated, filtered, encoded for variable storage lengths, and compressed using a lossless compression technique, the page record 500 is stored in the optimized document. Other information, such as indicia or sentinels that indicate the type of filtering applied to each page record 500 is also stored in the optimized document, though not necessarily attached to the stored page record. At end control block 218, the looping returns again to control block 206 if there is another page to process, as described above. Alternatively, once the last page in the source document is processed, the routine terminates.

Beneficially, as each page in an optimized document individually filtered, encoded, and compressed, each page in the optimized document can be independently and individually extracted from the optimized document. To that end, FIG. 7 is a flow diagram illustrating an exemplary page display routine 700 suitable for displaying a specific page of content in an optimized source document 400, whereas FIG. 8 illustrates another flow diagram illustrating an exemplary document display routine 800 for generally displaying the reflowable content in an optimized source document.

Figure 7:
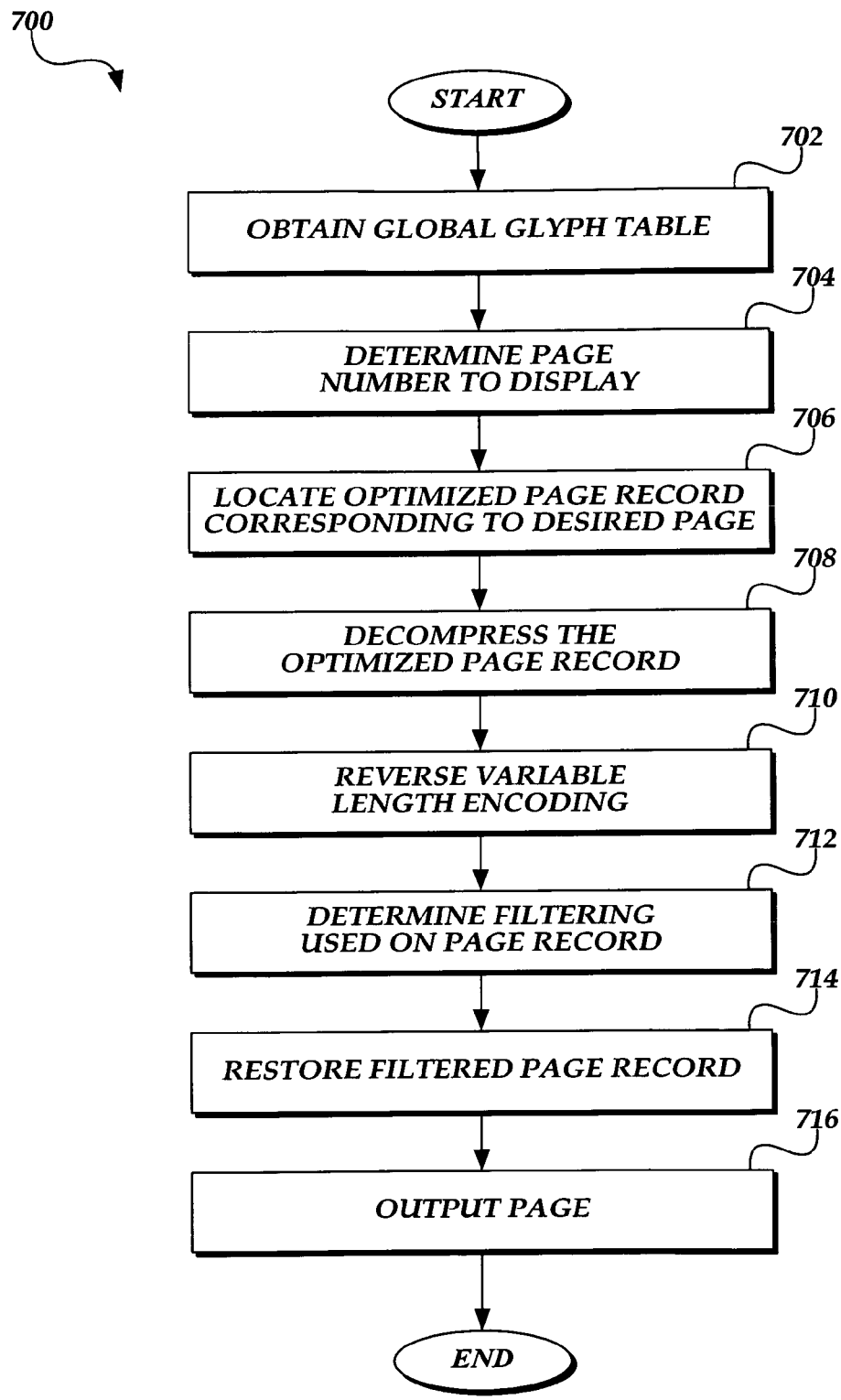
FIG. 7 is a flow diagram illustrating an exemplary page display routine suitable for displaying a page of content in an optimized source document.
Figure 8:
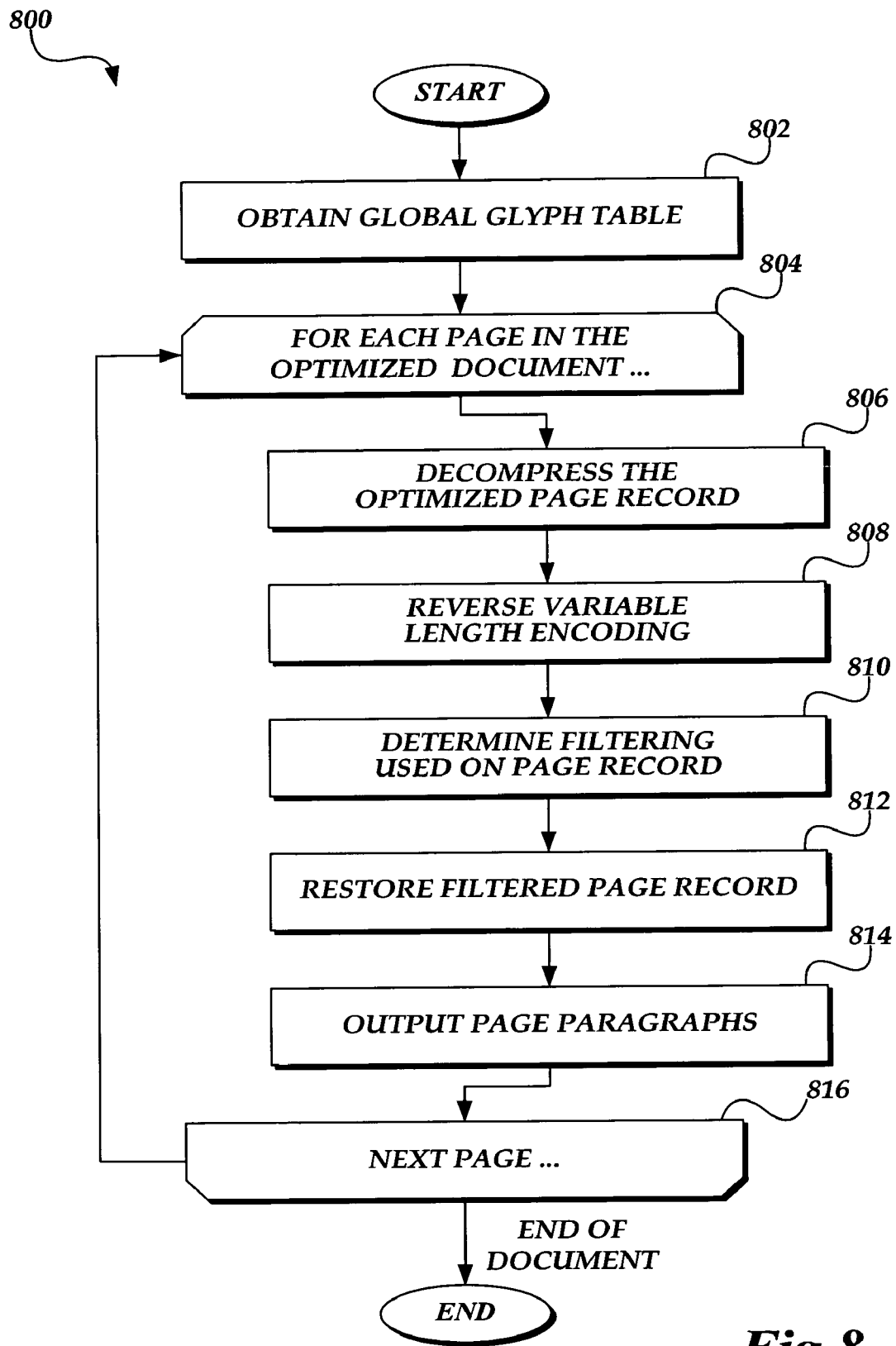
FIG. 8 is another flow diagram illustrating an exemplary general document display routine for displaying the reflowable content in an optimized source document.

With regard to FIG. 7, beginning at block 702, the global glyph table 102 is obtained from the optimized document 400. At block 704, the page within the optimized document to be displayed is determined. At block 706, the optimized page record 500 corresponding to the page to be displayed is located in the optimized document 400.

At block 708, the page record 500 is decompressed, reversing the lossless compression described above in regard to block 214 of FIG. 2. At block 710, the variable length encoding is reversed on the page record 500. At block 712, the filtering method (if any) used on the page record is determined, and at block 714 the filtering is reversed. Thereafter, at block 716, the page it output to a display device consistent with the procedures of outputting reflowable content as described in the above-incorporated and co-pending application "Method and System for Converting a Digital Image Containing Text to a Token-Based File for High-Resolution Rendering." Once output, the routine 700 terminates.

It should be appreciated that while steps 710, 712 and 714 are illustrated as being independently implemented from step 716, it is for illustration purposes only, and should not be viewed as limiting on the present invention. As those skilled in the art will appreciate, interpreting the values on the fly (as the content is displayed) may be made in conjunction with compensating or reversing the effects of the filtering and encoding.

In contrast to FIG. 7, FIG. 8 is a flow diagram illustrating an exemplary document display routine 800 for generally displaying the reflowable content in an optimized source document. Beginning at block 802, the global glyph table 102 is obtained from the optimized document 400. At control block 804, a loop structure is begun to iterate through and display each page in the optimized document 400. Accordingly, at block 806, the page record 500 is decompressed, reversing the lossless compression described above in regard to block 214 of FIG. 2. Of course, decompressing (or restoring a document) from its compressed state is well known in the art and, accordingly, is only referenced in this document.

At block 808, the variable length encoding is reversed on the page record 500. At block 810, the filtering method (if any) used on the page record is determined, and at block 812 the filtering is reversed. Thereafter, at block 814, the page is output to a display device. Thereafter, at end control block 816, the routine 800 loops back to block 804 if there are more pages in the optimized document to display. Alternatively, if there are not more pages in the optimized document 400 to display, the routine 800 terminates.

With regard to the processes/methods described above, it should be appreciated that they may be implemented on a variety of computing devices including, but not limited to, mini- and mainframe computers, workstations, desktop computers, notebook, laptop and tablet computers, as well as specialized devices and/or appliances including document/book readers. Moreover, components of the present invention may be suitably distributed over a plurality of cooperating computers in a computer network.

Figure 9:
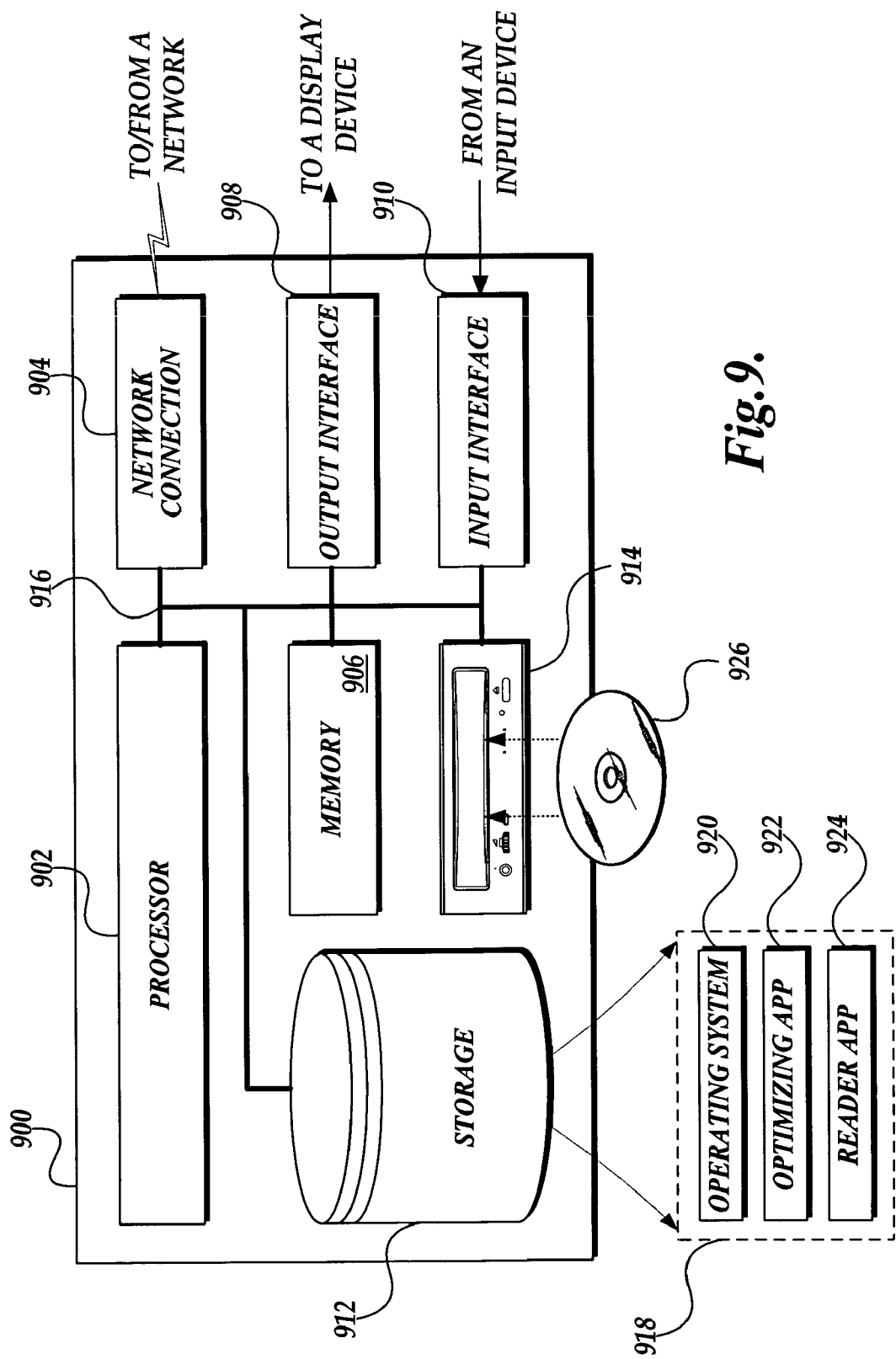
FIG. 9 is block diagram illustrating an exemplary computing system suitable for use in both optimizing a source document of reflowable content as well as displaying the content in an optimized source document.

While the present invention may be implemented on a variety of devices, FIG. 9 is a block diagram illustrating an exemplary embodiment of a suitable device 900 for implementing one or more embodiments of the present invention. In particular, the exemplary device 900 includes a processor 902, a memory 906, and a storage area 912, each interconnected via a system bus 916. When executing, the memory 906 of the exemplary device 900 typically stores all or portions of an operating system 920 as well as one or more executing user applications 922-924, some of which may be used to carry out various aspects and embodiments of the present invention. Similarly, the storage area 912, which is typically a non-volatile storage means, typically stores the operating system 920 for retrieval into memory 906 and execution by the processor 902. The storage area also typically stores one or more user applications and data as indicated by box 918. Data stored in the storage area 912 may include one or more optimized documents and/or source documents for processing or display by the exemplary device. The storage area 912 is typically comprised of one or more non-volatile storage components (in various combinations) including, but not limited to, a hard disk drive, ROM, non-volatile RAM, flash memory devices, and the like.

While illustrated as software applications stored in the storage area 912, it will be appreciated by those skilled in the art that any or all of the operating system 920, the optimizing application 922, or the reader application 924 (or components of them) may be implemented in hardware and or software.

Accordingly, numerous embodiments well understood in the art are viewed as falling within the scope of the present invention.

The exemplary device 900 also optionally includes a removable media device 914 for reading and/or writing information to and from removable media 926. Examples of a removable media device 914 include, but are not limited to, a CD- or DVD-ROM reader, a USB thumbdrive, flash memory device, removable hard drives, and the like. Source documents, optimized documents, as well as executable programs to optimize or display the same may be stored on the removable media 926.

The exemplary device 900 further optionally includes a network connection 904 that provides network access to and from external sources on a network. In at least one embodiment, the exemplary device 900 obtains an optimized document for display from an external recipient. Moreover, as indicated in FIG. 9, the network connection 904 may be configured as a wireless network connection communicating with a network using a wireless communication protocol such as, but not limited to, the IEEE 802.11x family of protocols, Bluetooth, WiMax, and the like. Alternatively, the network connection 904 may be configured as a wired connection to a network.

The exemplary device 900 also optionally includes an output interface 908 that connects the device 900 to a display device (not shown) for displaying a document to a user, the document being decoded from an optimized document 400. Similarly, the exemplary device 900 also optionally includes an input interface 910 that connects to one or more input devices (not shown) through which the user is able to provide display instructions of the document and/or direct the device to optimize a source document. Examples of input devices may include, but are not limited to, keyboards, keypads, digitizing pens, mouse, microphone, and the like. Of course, in many instances the output interface 908 and the input interface 910 are combined into a single I/O interface. Accordingly, these, as well as numerous components described herein, should be viewed as logical, not necessarily actual components.

Figure 10:
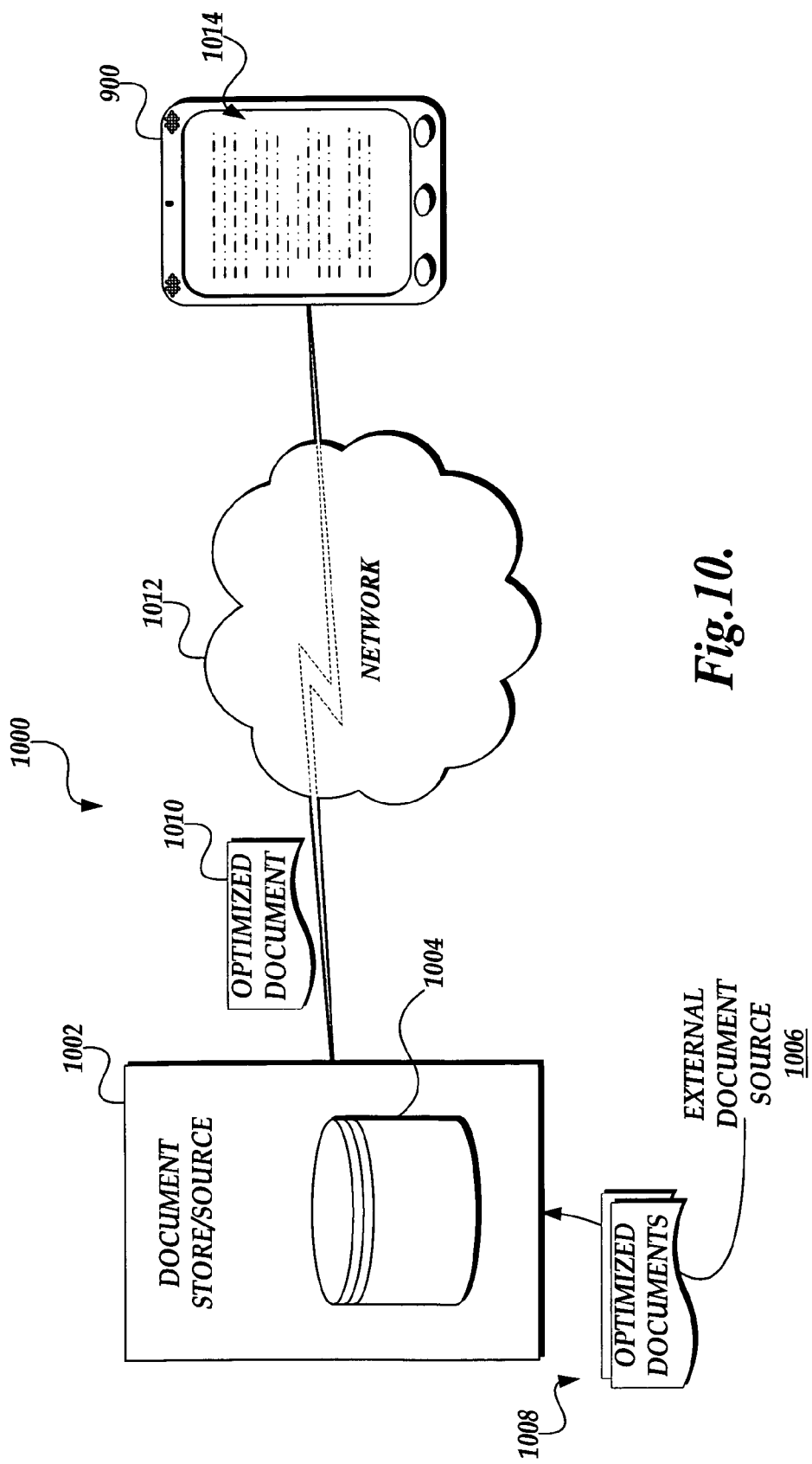
FIG. 10 is a pictorial diagram illustrating an exemplary network environment suitable for distributing optimized documents to a user computing device, such as those described in regard to FIG. 9.

FIG. 10 illustrates an exemplary network environment 1000 in which a user computing device 900, such as described above in regard to FIG. 9, may be used to display optimized documents. More particularly, the exemplary network environment 100 includes a document store/source 1002 for providing optimized documents, such as document 1010, to the user computing device 900 for display on its display device 1014, which in this case is integrated within the computing device 900. The user computing device 900 connects to the document store/source 1002 via a network 1012. As discussed above, the user computing device 900 may connect wirelessly (as shown in FIG. 10) or via a wired connection (not shown.)

In one operation, at the direction of a user, the user computing device 900 initiates a request for an optimized document to the document store/source 1002. This request may simply be a document request, or alternatively may be part of a purchase transaction for the rights to display the "purchased" document on the user computing device 900. The document store/source 1002 may store the requested optimized document 1002 in a local data store, such as database 1004, or may simply be a storefront or distribution director for obtaining optimized documents, such as documents 1008, from one or more external document sources 1006 and distributing them to user computing devices. Of course, once the user computing device 900 obtains an optimized document 1010, the user computing device will restore the document to its displayable form, as discussed in regard to FIG. 1, and display the document on the display device 1014.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computing device for optimizing a source document, the computing device comprising:
 a processor;
 a memory; and
 at least one executable module which, upon its execution, configures the computing device to:
  create an optimized document corresponding to the source document, wherein the source document comprises markup information for a plurality of pages of content; and
  for each page in the source document:
   create a page record for the page, each page record comprising the content for that page, wherein the page record comprises references to drawing representations of contours and vertices of textual content in the source document;
   for each set of values in the page record, selectively filtering the set of values to minimize the storage requirement for the set of values, wherein at least some of the values comprise references to drawing representations of the contours and vertices of textual content in the source document;
    wherein selectively filtering the set of values to minimize the storage requirement for the set of values comprises:
     establishing a base value for the set of values and adjusting the values in the set to be offsets from the base value; and
     from the base value, further adjusting each value in the set as a relative offset of its previous value in the set of values;
   compress the page record using a compression technique; and
   store the compressed page record in the optimized document.

2. The computing device of claim 1, wherein the content of the source document is reflowable content.

3. The computing device of claim 2, wherein the computing device is further configured by the at least one executable module to obtain a global drawing representation table describing all drawing representations of contours and vertices of textual content utilized within the source document and store the global drawing representation table in the optimized document.

4. The computing device of claim 3, wherein each page record of content comprises a word table including a list of the words in the page of content.

5. The computing device of claim 4, wherein the word table includes a list of the words in the page of content as they appear on the page.

6. The computing device of claim 4, wherein each page record of content further comprises a paragraph entry list for the page, each paragraph entry list including a reference to the words of the corresponding paragraph in the word table.

7. The computing device of claim 6, wherein each paragraph entry list includes a reference to the first and last word of the corresponding paragraph in the word table.

8. The computing device of claim 6, wherein each page record further comprises a word/drawing representation table, and wherein the word/drawing representation table includes references to drawing representations of the contours and vertices for each word on the page.

9. The computing device of claim 8, wherein the references to drawing representations in the word/drawing representation table comprises references to drawing representations in the global drawing representation table.

10. The computing device of claim 1, wherein selectively filtering the set of values to minimize the storage requirement for the set of values comprises storing a base value for the set of values and adjusting the values in the set of values to be offsets from the base value.

11. The computing device of claim 1, wherein selectively filtering the set of values to minimize the storage requirement for the set of values comprises establishing a base value for the set of values and adjusting each value in the set of values as an offset of its previous value.

12. The computing device of claim 1, wherein selectively filtering the set of values to minimize the storage requirement for the set of values comprises:
    filtering the set of values by establishing a first base value and adjusting each value in the set as a relative offset of its previous value in the set beginning with the first base value;
    filtering the set of values by establishing a second base value for the set of values and adjusting the values in the set to be relative offsets from the second base value;
    filtering the set of values by establishing a third base value for the set of values and adjusting the values in the set to be offsets from the third base value, and further adjusting each value in the set as a relative offset of its previous value in the set of values beginning from the third base value; and
    determining which filtering is optimal in minimizing the storage requirements for the set of values and selecting the optimal filtering for the set of values in the page record.

13. The computing device of claim 12, wherein determining which filtering is optimal in minimizing the storage requirements for the set of values comprises determining that no filtering is the optimal filtering in minimizing the storage requirements for the set of values.

14. The computing device of claim 1, wherein the computing device is further configured by the at least one executable module to, for each page in the source document:
    apply a variable length encoding to the page record; and
    wherein compressing the page record using a compression technique comprises compressing the optimum filtered and variable length encoded page record using a lossless compression technique.

15. The computing device of claim 14, further comprising a non-volatile storage area, and wherein the at least one executable module is stored in the non-volatile storage area prior to its execution.

16. The computing device of claim 14, further comprising a network interface connected to a network, and wherein the computing device obtains the source document from an external source over the network via the network connection.

17. The computing device of claim 16, wherein the computing device is further configured by the at least one executable module to respond to a request for the source document from an external requestor over a network by delivering the optimized document to the requestor.

18. A method for optimizing a source document comprising a plurality of pages of content, the method comprising:

obtaining a source document, wherein the source document comprises markup information for a plurality of pages of content;
creating an optimized document corresponding to the source document; and
for each page in the source document:
    creating a page record for the page, each page record comprising the reflowable content for that page, wherein the page record comprises references to drawing representations of contours and vertices of textual content in the source document;
    for each set of values in the page record:
        selectively filtering the set of values to minimize the storage requirement for the set of values, wherein at least some of the values comprise references to drawing representations of the contours and vertices of textual content in the source document;
        wherein selectively filtering the set of values to minimize the storage requirement for the set of values comprises:
            establishing a base value for the set of values and adjusting the values in the set to be offsets from the base value; and
            from the base value, further adjusting each value in the set as a relative offset of its previous value in the set of values;
    compressing the page record using a compression technique; and
    storing the compressed page record in the optimized document.

19. The method of claim 18, wherein the optimized source document comprises reflowable content.

20. The method of claim 19, further comprising obtaining a global drawing representation table describing all drawing representations of contours and vertices of textual content utilized within the document and storing the global drawing representation table in the optimized document.

21. The method of claim 19, wherein each page record of content comprises a word table including a list of the words in the page of content.

22. The method of claim 21, wherein the word table comprises a word table comprising a list of the words in the page of content.

23. The method of claim 21, wherein each page record of content further comprises a paragraph entry list for the page, each paragraph entry list including a reference to the words of the corresponding paragraph in the word table.

24. The method of claim 23, wherein each paragraph entry list includes a reference to the first and last word of the corresponding paragraph in the word table.

25. The method claim 23, wherein each page record of content further comprises a word/drawing representation table, wherein the word/drawing representation table includes references to drawing representations of the contours and vertices for each word in the page.

26. The method of claim 24, wherein the references to drawing representations in the word/drawing representation table comprises references to drawing representations in the global drawing representation table.

27. The method of claim 18, wherein selectively filtering the set of values to minimize the storage requirement for the set of values comprises storing a base value for the set of values and adjusting the values in the set of values to be offsets from the base value.

28. The method of claim 18, wherein selectively filtering the set of values to minimize the storage requirement for the set of values comprises establishing a base value for the set of values and adjusting each value in the set of values as an offset of its previous value.

29. The method of claim 18, wherein selectively filtering the set of values to minimize the storage requirement for the set of values comprises:
   filtering the set of values by establishing a first base value and adjusting each value in the set as a relative offset of its previous value in the set beginning with the first base value;
   filtering the set of values by establishing a second base value for the set of values and adjusting the values in the set to be relative offsets from the second base value;
   filtering the set of values by establishing a third base value for the set of values and adjusting the values in the set to be offsets from the third base value, and further adjusting each value in the set as a relative offset of its previous value in the set of values beginning from the third base value; and
   determining which filtering is optimal in minimizing the storage requirements for the set of values and selecting the optimal filtering for the set of values in the page record.

30. The method of claim 18, wherein determining which filtering is optimal in minimizing the storage requirements for the set of values comprises determining that no filtering is the optimal filtering in minimizing the storage requirements for the set of values.

31. The method of claim 18, further comprising, for each page in the source document, applying a variable length encoding to the page record; and
   wherein compressing the page record using a compression technique comprises compressing the optimum filtered and variable length encoded page record using a lossless compression technique.

32. The method of claim 18, wherein obtaining the source document comprises obtaining the source document from an external requestor over a network.

33. The method of claim 18, further comprising, in response to a request for the source document from an external requestor over a network, delivering the optimized document to the requestor.

* * * * *